US 6,587,246 B1

(12) United States Patent
Anderton et al.

(10) Patent No.: US 6,587,246 B1
(45) Date of Patent: Jul. 1, 2003

(54) SCANNING APPARATUS

(75) Inventors: Rupert N Anderton, Malvern (GB); Alan H Lettington, Reading (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/786,313

(22) PCT Filed: Aug. 27, 1999

(86) PCT No.: PCT/GB99/02834
§ 371 (c)(1),
(2), (4) Date: Mar. 9, 2001

(87) PCT Pub. No.: WO00/14587
PCT Pub. Date: Mar. 16, 2000

(30) Foreign Application Priority Data

Sep. 2, 1998 (GB) ............................................. 9819064

(51) Int. Cl.⁷ ............................ G02B 26/08; H01Q 3/00
(52) U.S. Cl. ........................ 359/212; 359/220; 359/226; 359/205; 250/234; 250/332; 250/334; 343/757
(58) Field of Search ................................ 359/196, 197, 359/205, 207, 208, 212, 220, 223, 226; 250/234–236, 332, 334; 343/757, 761, 763, 766

(56) References Cited

U.S. PATENT DOCUMENTS

| 3,516,722 A | 6/1970 | Pusch |
| 4,041,500 A | 8/1977 | Lapp |
| 4,042,933 A | 8/1977 | Lapp |
| 4,665,401 A | 5/1987 | Garrard et al. |
| 4,923,263 A | 5/1990 | Johnson |
| 5,274,235 A | * 12/1993 | Taylor ........................ 250/332 |
| 6,259,414 B1 | * 7/2001 | Lettington .................. 343/757 |

FOREIGN PATENT DOCUMENTS

| EP | 0 423 812 | 4/1991 |
| EP | 0 459 010 | 12/1991 |
| EP | 0 533 036 | 3/1993 |
| EP | 0 809 123 | 11/1997 |
| GB | 2 120 804 | 12/1983 |
| GB | 2 228 584 | 8/1990 |
| WO | WO98/47020 | 10/1998 |

* cited by examiner

Primary Examiner—James Phan
(74) Attorney, Agent, or Firm—Nixon & Vanderhye P.C.

(57) ABSTRACT

Scanning apparatus which may be used in a real-time passive millimeter wavelength imaging system or in other radiometry systems. The apparatus scans input radiation from a scene and output radiation is transmitted to a receiver system, for example a millimeter wave imaging camera or a radar receiver. The apparatus comprises a rotatable reflective plate having an axis of rotation passing through the centre of its surface and a lens arrangement for selectively transmitting and focusing radiation having a particular direction of polarisation. The apparatus may also comprise a feed horn array comprising a plurality of feed horns, the feed horns forming part of a spherical surface having a radius of curvature substantially equal to R/2 and being concentric with the third substantially spherical polarising element. The apparatus may further comprise a detector array comprising a plurality of detector elements. The detector array may form part of a millimeter wave imaging camera.

25 Claims, 9 Drawing Sheets

Fig.1. PRIOR ART.
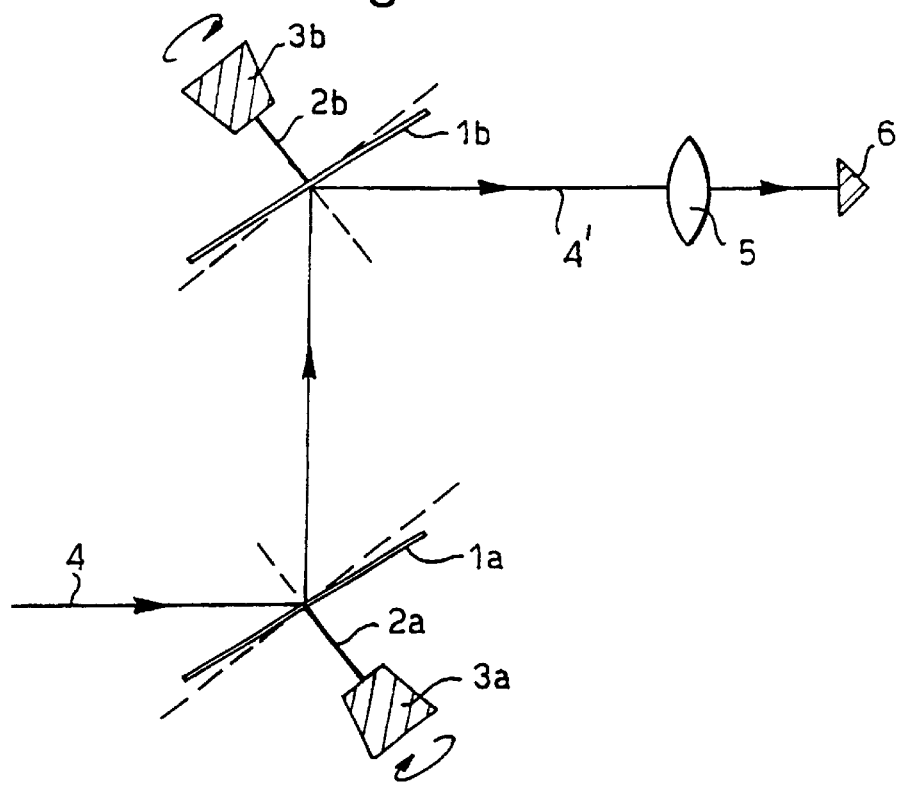
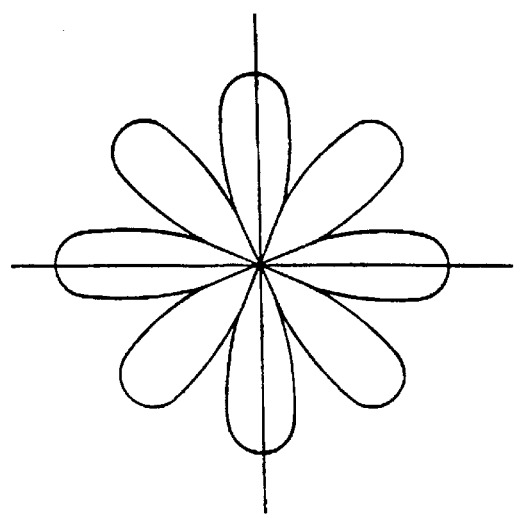
Fig.2(a).
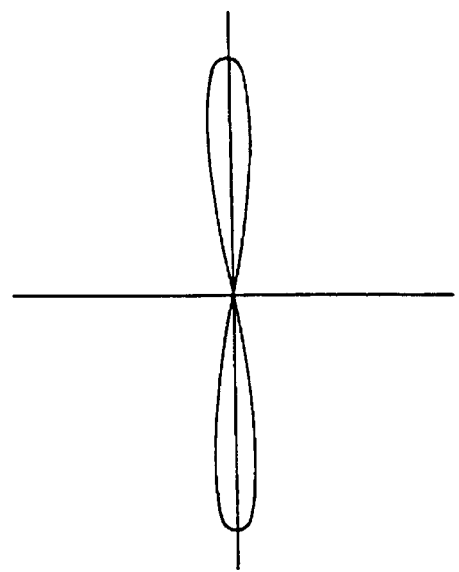
Fig.2(b).

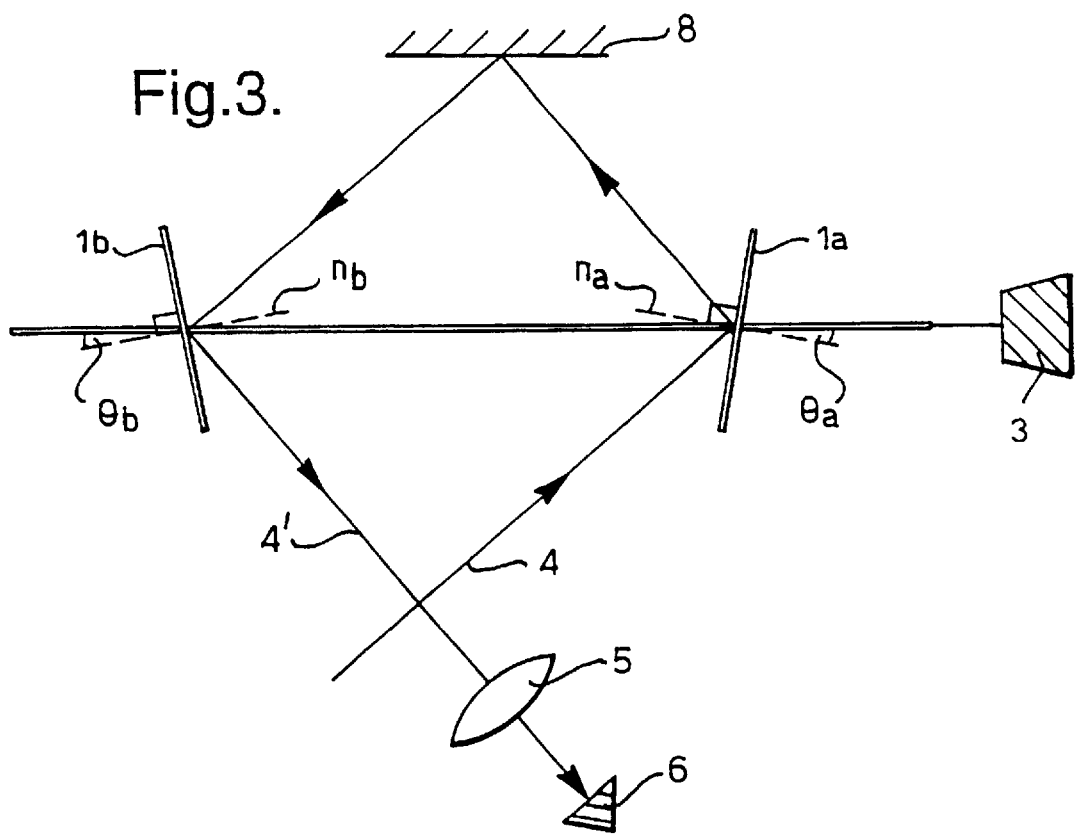
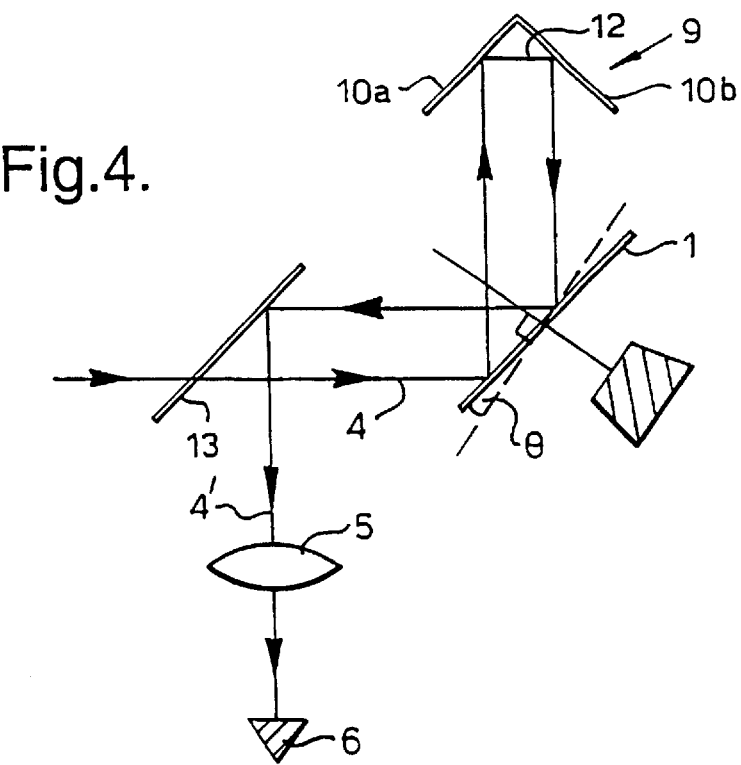

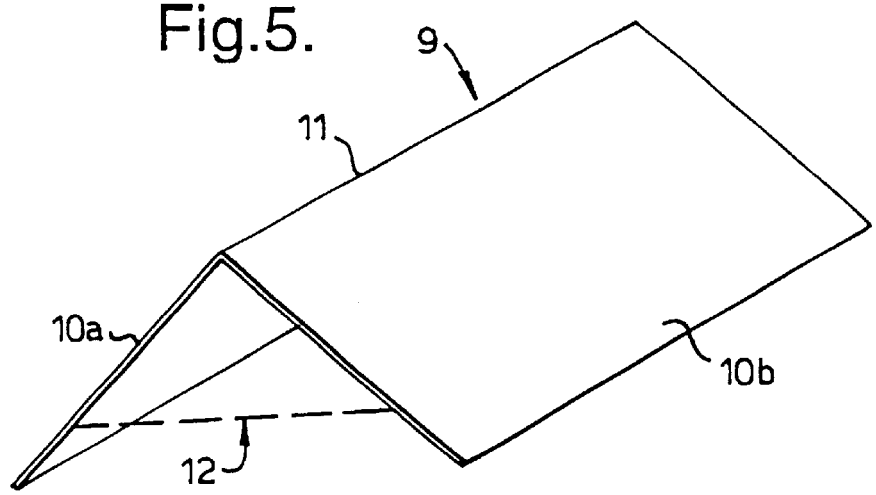
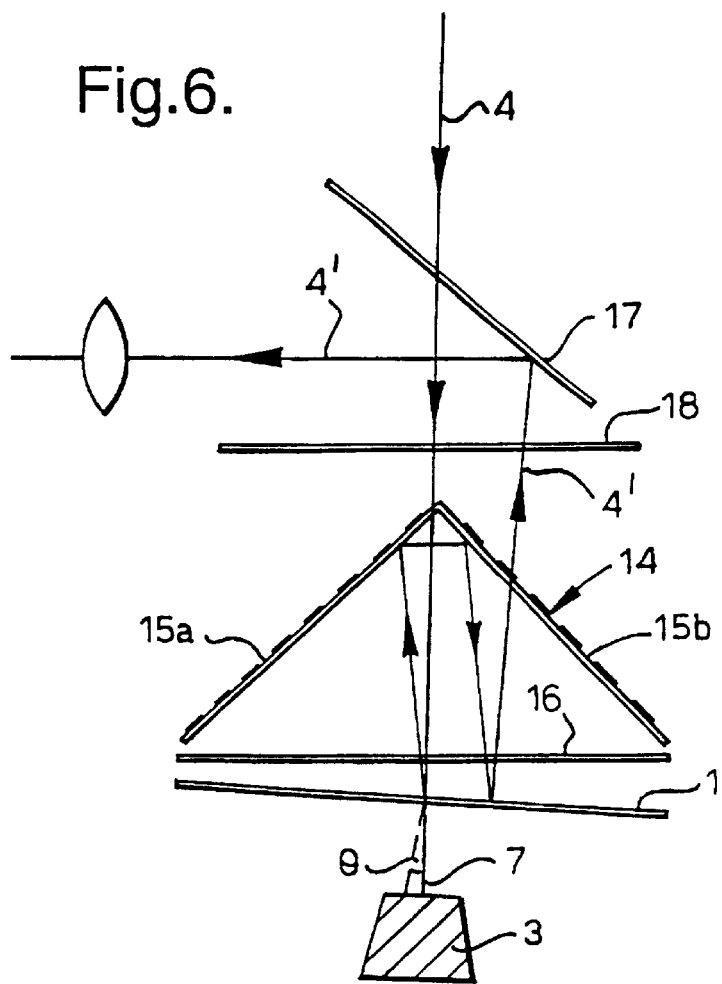

Fig.9.
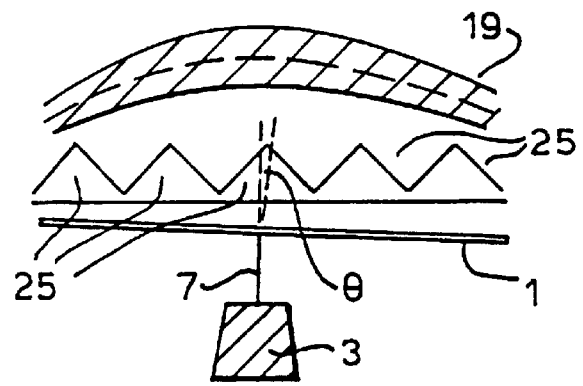
Fig.10.
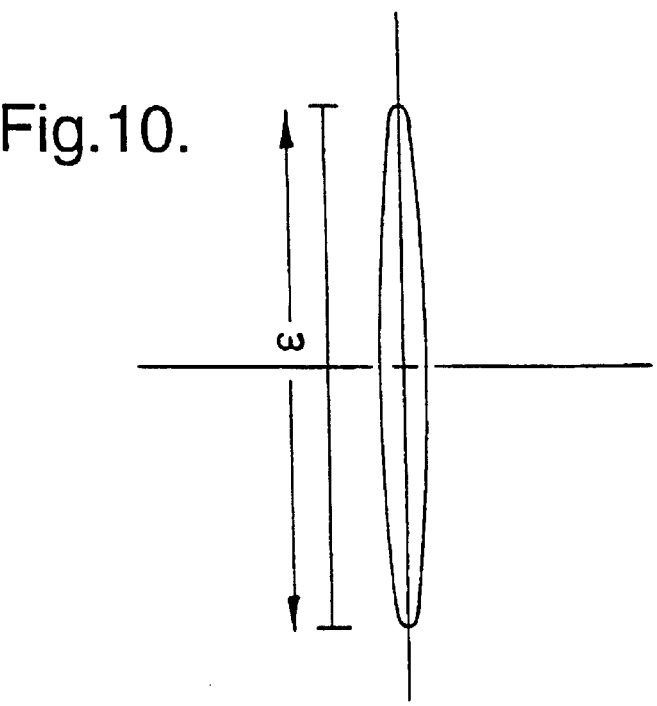

Vertical Field of View

Horizontal Field of view

SCANNING APPARATUS

BACKGROUND OF THE INVENTION

1. Field of the Invention

The invention relates to scanning apparatus which may be used in a real-time imaging system and, in particular, in a real-time passive millimetre wave imaging system. The scanning apparatus may also be used in other radiometry systems.

2. Discussion of Prior Art

British Patent No. 700868 (February 1952—December 1953) describes a twistreflector which relates to a similar field as the present invention.

Millimetre wave imaging is potentially useful as an all-weather surveillance and guidance aid but any practically useful system must be capable of imaging in real-time. This is not possible using existing systems. In a millimetre wave imager, radiation from the scene to be scanned is collected by means of a concave mirror or a lens and is focused onto an array of millimetre wave receivers. At present, large two-dimensional arrays of receivers which cover the whole of a required image are not available. Instead, a far smaller number of receivers is scanned across the image in order to build up the complete picture. A similar technique is used in some infrared imagers (for example EP 0226273).

Current millimetre wave imaging systems use mechanical scanning of one or several channels to synthesise an image. Ultimately, electronic scanning and staring array techniques could be developed to implement real-time millimetre wave imaging, although there are several problems associated with such a solution. Firstly, as the wavelength is necessarily long, in order to image under adverse weather conditions the system aperture must be large to gain adequate resolution. In some millimetre wave imaging systems the input aperture may be of the order of 1 m in diameter. Secondly, the cost per channel is high so that any electronically scanned or staring array technique is expensive. Furthermore, in the case of millimetre wave staring arrays there are fundamental problems analogous to the cold shielding problems encountered in infrared systems.

Another requirement of a practical millimetre wave imaging system is that it must be able to operate at TV-compatible rates (i.e. 50 Hz for the UK, 60 Hz for the USA). In the infrared, scanning systems are often plane mirrors flapping about an axis contained within their surface. This is not a practical option in the millimetre waveband as large aperture mirrors would be required to flap back and forth at TV-compatible rates, requiring a large change in inertia at the end of each scan.

In infrared imaging systems, where input apertures are typically only 10 mm in diameter, rotary systems have been used (EP 0226273). Furthermore, in the infrared, it is usual to employ afocal telescopes to match the field of view in the scene to that of the rotating polygon. This is impractical in high resolution millimetre wave imaging where the input apertures have considerably greater diameters and afocal telescopes would need to be excessively large.

Any scanning mechanism used in a millimetre wave imaging system must therefore be situated in either the object or the image plane. Furthermore, any scanning mechanism situated in the image plane must have good off-axis performance. This is difficult to achieve using existing technology.

Another known scanning method used in infrared imagers is a system of two discs rotating about axes which are slightly inclined to the normals to their faces. Radiation incident on the first disc is reflected at oblique incidence from the first rotating disc and passes to the second disc to experience a second reflection. By varying the orientation and relative speed of rotation of the discs, varying scan patterns can be achieved. Such a two-axis rotating disc system would not be ideal for use in millimetre wave imaging, however, as the system would be inconveniently large.

SUMMARY OF THE INVENTION

It is an object of the present invention to provide a compact object space scanning apparatus which may be used, in particular, to implement real-time millimetre wave imaging, or in radar systems. It is also an object of the invention to provide a scanning apparatus which has limited power requirements and minimum inertia and gives good off axis performance.

According to the present invention, apparatus for scanning input radiation from a scene and for generating output radiation to form an image at a curved detector array comprises;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to the normal to the reflective plate at the centre of rotation, rotary means for rotating the reflective plate and focussing means for producing an image at the detector array characterised in that the converging effects of the focusing means and the rotatable reflective plate co-operate with the curvature of the detector array to focus the image onto the detector array.

The rotatable reflective plate may be a substantially plane reflector.

In a preferred embodiment, the apparatus may comprise a rotatable reflective plate which exhibits a concave profile for producing an image at the detector array, thereby incorporating the function of the focusing means into the rotatable reflective plate.

In a further preferred embodiment a dielectric layer is located on the surface of the concave rotatable reflective plate to form a rotatable Mangin mirror configuration, for providing optical correction. The profile of the dielectric layer may be different to the profile of the rotatable reflective plate. The surface of the dielectric layer and the surface of the rotatable reflective plate are preferably both aspheric.

In particular, the apparatus is such that astigmatism and coma aberrations in the image formed at the detector array are minimised.

In a further preferred embodiment the rotatable Mangin mirror may be used in conjunction with a lens arrangement located between the rotatable reflective plate and the detector array arranged to receive both input radiation from the scene and input radiation reflected from the rotatable reflective plate, and being capable of selectively transmitting and focusing radiation having a particular direction of polarisation, the lens arrangement comprising a first polarising element, for selectively transmitting and selectively reflecting radiation having a particular direction of polarisation, the first polarising element having a first polarisation axis and having a substantially flat surface, a second element for rotating the direction of polarisation of radiation through substantially 45° and a third polarising element, for selectively transmitting and selectively reflecting radiation having a particular direction of polarisation, the third polarising element having a third polarisation axis and having a substantially flat surface, the third polarisation axis making an angle of substantially 45° with the first polarisation axis, The arrangement of the apparatus being arranged such that the optical path within the apparatus is reduced and a compact configuration is achieved.

In a further preferred embodiment, apparatus for scanning input radiation from a scene and for generating output radiation to form an image at a detector array comprises;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to the normal to the reflective plate, rotary means for rotating the reflective plate and a lens arrangement arranged to receive both input radiation from the scene and input radiation reflected from the rotatable reflective plate, and being capable of selectively transmitting and focusing radiation having a particular direction of polarisation, the lens arrangement comprising a first polarising element, for selectively transmitting and selectively reflecting radiation having a particular direction of polarisation, the first polarising element having a first polarisation axis and having a substantially flat surface, a second element for rotating the direction of polarisation of radiation through substantially 45° and a third polarising element, for selectively transmitting and selectively reflecting radiation having a particular direction of polarisation, the third polarising element having a third polarisation axis and a substantially spherical surface having a centre of curvature, C, and a radius of curvature, R, the third polarisation axis making an angle of substantially 45° with the first polarisation axis, wherein (i) the axis of rotation of the plate passes through the centre of curvature, C, and (ii) the separation of the first polarising element and the centre of curvature, C, along the axis of rotation and the separation between the first polarising element and the plate along the axis of rotation are substantially equal, the arrangement of the apparatus being such that in use optical aberrations in the image formed at the detector array are minimised.

In particular, the apparatus is such that astigmatism and coma aberrations in the image formed at the detector array are minimised.

The apparatus may also comprise a feed horn array comprising a plurality of feed horns, the feed horns forming part of a spherical surface having a radius of curvature substantially equal to R/2 and being concentric with the third polarising element. The apparatus may also comprise a detector array, comprising a plurality of detector elements. The detector array may form part of a millimetre wavelength imaging camera.

Preferably, the first polarising element may be a planar grid of wires and the third polarising element may a substantially spherical grid of wires.

The apparatus may comprise two or more lens arrangements arranged in series.

In a further preferred embodiment, the apparatus may further comprise a corrector plate located between the rotatable disc and the third polarising element for removing spherical aberrations from an image formed at the detector array.

In a further preferred embodiment, the corrector plate is a weak converging element to allow the over-dimensioning of the lens arrangement to be eliminated.

In a further preferred embodiment the corrector plate exhibits an aspheric convex profile.

In a further preferred embodiment, the rotatable reflective plate is a weak converging element for removing spherical aberrations from the image formed at the detector array and to allow the over-dimensioning of the lens arrangement to be eliminated.

In a further preferred embodiment the rotatable reflective plate is a strong converging element to allow the converging power of the lens arrangement to be reduced.

In a further preferred embodiment the rotatable reflective plate exhibits an aspheric concave profile.

The apparatus may also include a radar receiver.

In a further preferred embodiment, the angle of inclination $\theta_a$ is between 1° and 10°.

For the purpose of this description, the term "polarising element" shall be taken to mean any element which acts on a particular polarisation of radiation, including elements which act on unpolarised radiation but which do not produce polarised radiation.

BRIEF DESCRIPTION OF THE DRAWINGS

The invention will now be described, by way of example only, with reference to the following figures in which;

FIG. 1 shows a diagram of a conventional rotating two axis, two disc system,

FIGS. 2(a) and 2(b) show examples of the scan patterns which may be achieved using the rotating two disc system in FIG. 1, FIG. 3 shows the single axis two disc system of the present invention, FIG. 4 shows a one disc scanning system comprising a roof reflector, FIG. 5 shows a roof reflector, FIGS. 6 shows a compact one disc scanning systems comprising a polarising roof reflector, FIG. 9 shows a one disc scanning system employing a plurality of roof reflector elements, FIG. 10 shows a near linear open scan pattern.

DETAILED DISCUSSION OF PREFERRED EMBODIMENTS

Figure 7:
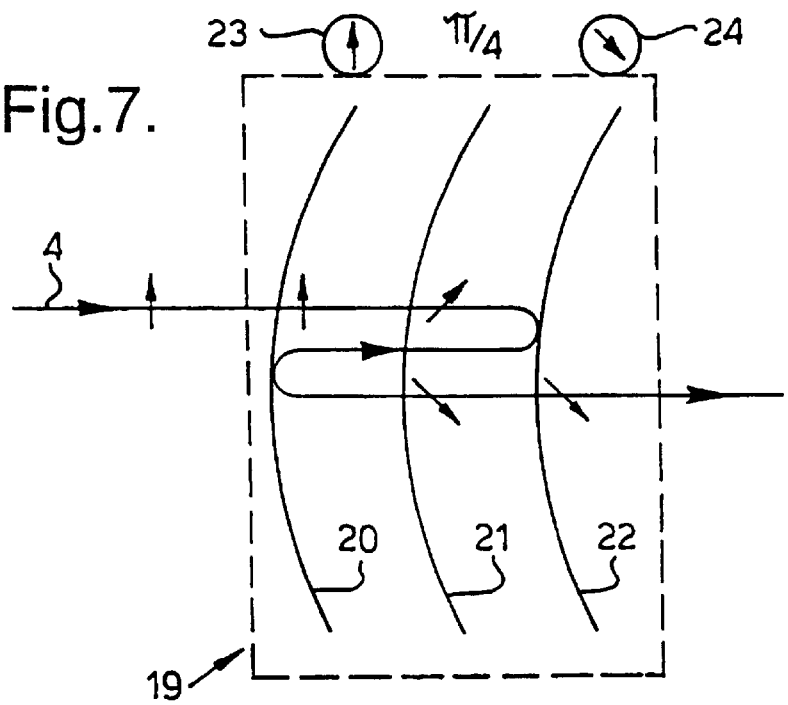
FIG. 7 shows a schematic diagram of a reflector lens which may be used in the scanning apparatus.

Referring to FIG. 1, a conventional two disc rotating system comprises two discs 1a,1b, each supported on a separate axis 2a,2b which is connected to a rotor mechanism 3a,3b. Each axis 2a,2b is inclined a few degrees to the normals to the faces of the discs 1a,1b. Typically the angle of inclination is 5°. As the discs 1a, 1b rotate about their respective axes, incident radiation 4 from the scene is incident on the first rotating disc 1a and is reflected at oblique incidence towards the second rotating disc 1b where it experiences a second reflection. From the second rotating disc 1b, radiation may be passed to an imaging or receiving system, typically comprising collection optics 5 and a receiver 6 (or receiver array). For example, the receiver 6 may be the receiver element of a millimetre wave imaging camera or the receiver element of a radar system.

The two discs 1a,1b may be inclined at the same or different angles to the normal to the respective disc face and may rotate with the same or different speeds, depending on the scan pattern required at the imager. If the two discs 1a,1b are inclined at different angles to their axes of rotation and are rotated at different speeds, a two-dimensional scan pattern will be achieved. If the angles of inclination of the two discs are the same, two discs rotating in the same direction give rise to a petal scan pattern, as shown in FIG. 2a. If the angles of inclination of the two discs are the same and the discs rotate at the same speed but in opposite directions an almost linear scan pattern may be achieved, as shown in FIG. 2b.

For operation at millimetre wavelengths the apparatus shown in FIG. 1 is required to be large and, furthermore, is rather complex. It is therefore impractical for use at these wavelengths. Referring to FIG. 3, a compact scanning apparatus, suitable for use in a millimetre wave imaging system, comprises two reflecting plates, for example discs 1a,1b, supported on a single axis 7 passing through the centre of the surface of each disc 1a,1b, a rotary mechanism 3 and a fixed, plane mirror 8. Radiation 4 from the image scene falls onto the first rotating mirror 1a. Any one direction of the incident radiation 4 undergoes a conical scan on reflection and falls onto the plane mirror 8. From the mirror 8 radiation is reflected to the second rotating disc 1b where it is reflected to the collection optics 5 of the imager. From the collection optics, radiation is focused to the receiver element 6 of the imaging system situated in the image plane of the focusing optics 5.

The normals, $n_a, n_b$, to the two discs 1a,1b make an angle $\theta_a, \theta_b$ respectively to the axis of rotation 7. For the configuration shown in FIG. 3, where the discs 1a,1b are inclined in opposite directions, the direction of the scan is perpendicular to the plane containing both the axis of rotation 7 and a normal to the plane of the mirror 8. If the two mirrors are tilted in the same direction, rather than in opposite directions, the direction of the scan is in the plane containing both the axis of rotation 7 and a normal to the plane of the mirror 8. Typically, the angles $\theta_a, \theta_b$ maybe between 1° and 10°.

It is advantageous to have the angles of inclination ($\theta_a, \theta_b$) of the rotating discs 1a,1b in the same plane and of substantially the same amount ($\theta_a = \theta_b = \theta$) but in opposite directions. In this case, the forces due to the tilt of the mirrors and their windage cancel on the axis of rotation 7. With the configuration shown in FIG. 3, the incident beam of radiation 4 is scanned through an angle of ±4θ (where θ is the angle of inclination of the mirrors to the normal to the axis of rotation 7). Therefore, for example, an inclination of 4° produces a total field of view of 32° in the scene.

After radiation 4' has been reflected from the two reflecting discs 1a,1b, it is focused by the collection optics 5 onto the receiver 6 of the imaging system. The receiver 6 may typically be one or more millimetre wave detectors in an array. A temporal encoded form of the image is recorded by the detector or detectors in the image plane and, from a knowledge of the scan pattern, a two dimensional image may be unfolded from the temporal encoded signal or signals.

For particular disc angular velocities and phases the resulting scan pattern is a raster scan. For reasons associated with the way the eye processes a moving image, a raster scan may be the most desirable form of scan. Furthermore, using a raster scan a linear array of detectors could be used, each detector recording one or several lines in the image. This architecture eases the unfolding of the data to form the required image.

For example, with the two discs (FIG. 3) rotating at the same speed, the resulting scan is a line scan in one dimension. The second dimension in the image may be formed by a linear array of detectors positioned at 90° to the line scan. In this case the number of image pixels in one direction would be the same as the number of detectors.

In an alternative embodiment of the scanning apparatus, the two rotating discs may be replaced with just one rotating disc 1, as shown in FIG. 4, further reducing the size of the entire apparatus. In this configuration, the apparatus also comprises a 90° ($\pi/2$) roof reflector 9.

The construction of the roof reflector 9 is described with reference to FIG. 5. The roof reflector 9 may comprise two flat reflective surfaces 10a,10b which are inclined at substantially 90° to each other and are in contact along an apex 11. In the figure, a hypothetical line 12 is drawn between the two reflective surfaces 10a,10b, wherein the line 12 is substantially orthogonal to the apex 11. The line 12 shall hereinafter be referred to as the line of intersection of the two surfaces 10a,10b.

Referring to FIG. 4, radiation 4 from the scene is incident on the disc 1 and is reflected to the 90° ($\pi/2$) roof reflector 9 where it reflected back to the rotating disc 1 and then reflected to the collection optics 5 of the imaging system, via a beam splitter 13 which separates the path of incoming and outgoing radiation. Although it is preferable to separate the path of input radiation 4 from the path of output radiation 4', in some operating configurations it may not be essential and the beam splitter 13 may be omitted from the apparatus shown in the FIG. 4.

As in the previous example, the rotating disc is inclined slightly to the normal to the axis of rotation 6 by an angle θ. Typically, the angle of inclination, θ, may be 5°. Using this configuration, an almost linear angular scan (as shown in FIG. 2(b)) is achieved in a plane parallel to the line of intersection 12 of the two reflective surfaces 10a,10b.

Although it is preferable to use a roof reflector in this arrangement, two independent reflective surfaces may also be used, where the two reflective surfaces are inclined such that they are at an angle of substantially 90° to each other but are not necessarily in contact. This arrangement, however, would result in a loss of some radiation reflected from the disc to the reflective surfaces.

The beam splitter 13 may be a conventional polarising mirror and provides a means of separating output radiation 4', for transmission to the imaging system, from input radiation 4. A conventional polarising mirror typically consists of a flat transparent plastic sheet with closely spaced, thin, parallel conducting wires. If the wires are oriented at an angle of 45° ($\pi/4$) to incident radiation, only 45° linear polarised radiation is transmitted. The parallel conducting wires of the polarising mirror are oriented at an angle of 45° to the incident radiation 4, and therefore only 45° linear polarised radiation therefore propagates to the roof reflector 9. Transmitted radiation is therefore incident at the roof reflector 9 with its polarisation inclined at 45° to the line of intersection 12 of the two reflective surfaces 10a,10b. Radiation 4 experiences a 90° rotation of its direction of polarisation on reflection at the roof reflector 9 and is transmitted to the reflective disc.

Upon reflection from the rotating disc 1 for this second time radiation is therefore $-\pi/4$ linearly polarised and is subsequently reflected by the polarising mirror 13 and passed to the collection optics 5. The polarising mirror 13 is therefore transparent for incoming radiation polarised in a direction perpendicular to the direction of the conducting wires and is reflective for incoming radiation polarised parallel to the direction of the conducting wires. The arrangement shown in FIG. 4 would therefore only allow a single polarisation to be detected at the receiver 6.

In this embodiment, the rotating disc 1 has to be overdimensioned compared to the aperture of the collection optics 5, firstly because its axis of rotation is inclined to the direction of the incident and reflected beams and secondly because there is a significant displacement of the beam from its mean position as the mirror rotates about its axis.

Both of these effects may be overcome by placing the rotating disc 1 close to the roof reflector 9, as shown in FIG. 6. As in the previous examples, the normal to the rotating disc 1 is slightly inclined at an angle, θ, to the axis of rotation 7. In this configuration, the scanning apparatus includes a polarising roof reflector 14 comprising two substantially flat polarisers 15a,15b inclined at substantially 90° to each other. The two polarisers 15a,15b take the place of the two reflective surfaces 10a,10b in FIG. 5. The polarisers 15a,15b have polarisation axes oriented to transmit radiation having substantially the same polarisation and substantially parallel or perpendicular to the line of intersection 12 of the two polarisers 15a,15b, therefore substantially perpendicular or parallel to the apex 11 (see FIG. 5). As mentioned previously, it would also be possible to use two independent polarisers in place of the polarising roof reflector, where the two polarisers are inclined at substantially 90° but are not necessarily in contact.

In this embodiment, the scanning apparatus also comprises a Faraday rotator 16 for rotating the direction of polarisation of radiation by 45° ($\pi/4$). Radiation incident on the Faraday rotator 16 undergoes a rotation in its direction of polarisation each time it passes through (i.e. 45° rotation per pass). Radiation 4 having one particular direction of polarisation is input through the roof reflector 14 to the Faraday rotator 16. Radiation is reflected by the rotating disc 1 and its direction of polarisation is therefore rotated by a further 45° as it is transmitted back through the Faraday rotator 16. The radiation is then reflected at the roof reflector 14 and experiences a further total rotation in its direction of polarisation of 90° as it passes back and forth through the Faraday rotator 16, while being reflected for a second time at the rotating disc 1. At this point, the direction of polarisation is such that radiation 4' is able to pass through the roof reflector 14.

Alternatively, the Faraday rotator 16 may be replaced with a millimetre wave birefringent surface, such as a Meanderline. For incident plane polarised radiation, which may be resolved into two perpendicular components each oriented at $\pi/4$ (45°) to the direction of polarisation of the incident beam, a meander line may be constructed to introduce a 90° ($\pi/2$) phase shift between the two perpendicular components. A 90° ($\pi/2$) phase shift is therefore introduced in the state of polarisation of radiation each time radiation passes through the Meander-line. Further details relating to Meander-lines may be found in the following references; L. Young et al., *IEEE Transactions on Antennas and Propagation*, vol AP-21, pp 376–378, May 1973, and R-S Chu et al., *IEEE Transactions on Antennas and Propagation*, vol AP-35, No 6, pp 652–661, June 1987.

Having passed through the roof reflector 14, plane polarised radiation incident on the Meander-line is therefore circularly polarised. The circularly polarised radiation is reflected from the rotating disc 1 and passes back through the meander line to the polarising roof reflector 14 where it is reflected on the first pass, back through the Meander-line and the reflective disc, but is transmitted on the subsequent pass.

In practice, a number of Meander-lines may need to be used in a stacked configuration to give the required $\pi/2$ phase shift between the two axes. The Meander-lines may be more suitable for use in millimetre wave imaging at the long wavelength end of the wave band (e.g. 35 GHz).

The path of output radiation 4' reflected from the scanning apparatus is separated from the input radiation 4 using an inclined flat polariser 17 and an additional 45° Faraday rotator 18. Output radiation 4' is therefore separated from the path of input radiation 4 and is directed to the collection optics 5 of the imaging system. In this configuration, it is essential that the polariser 17 reflects radiation at substantially 45° to the direction of polarisation transmitted by the two polarisers 15a,15b (i.e. at 45° to the apex 11). When using this roof reflector 14 the direction of the scan at the imager is parallel to the line of intersection 12 of the two polarisers 14a,14b of the roof reflector 15. In this configuration, the imaging system will detect a single polarisation state only.

Although it is preferable to separate the path of input radiation 4 from the path of output radiation 4', in some operating configurations it may not be essential and the polariser 17 and the Faraday rotator 18 may therefore be omitted from the apparatus shown in the FIG. 6.

Figure 8:
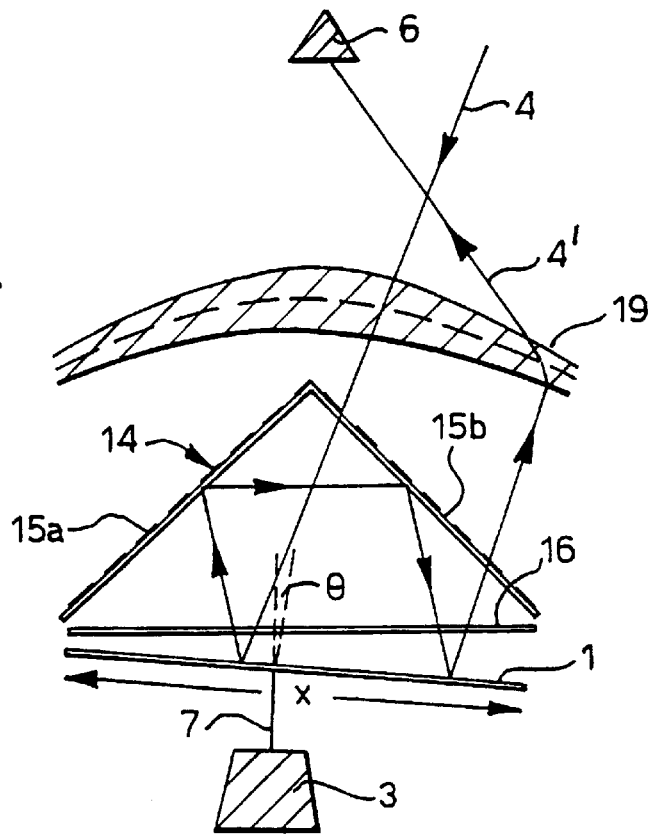
FIG. 8 shows a diagram of a one disc scanning system, including the polarisation sensitive reflector lens in FIG. 7.
Figure 11:
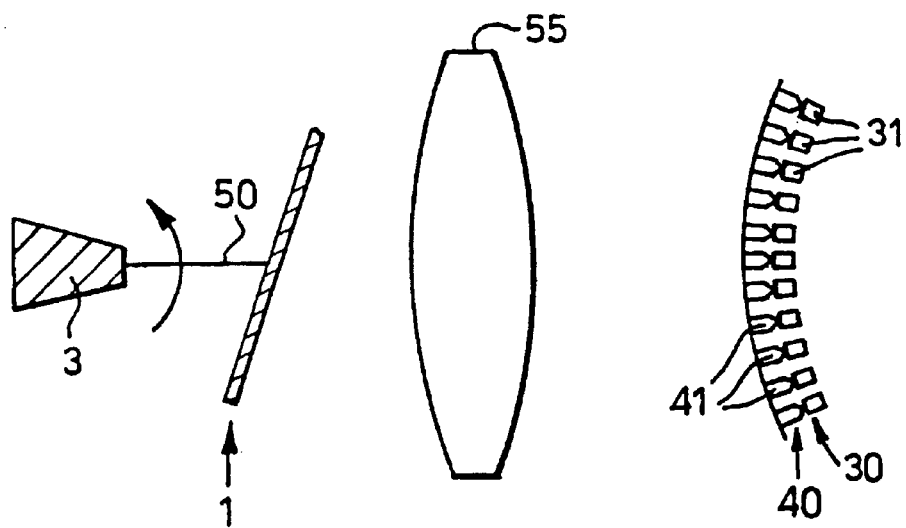
FIG. 11 shows an embodiment of the apparatus that may be used to provide a conical scan pattern.

FIG. 8 is a modification of FIG. 6 and includes powered optical components to enable focused radiation to be passed directly to the receiver 6. For example, FIG. 7 shows a reflector lens 19 which may be included in the scanning apparatus. The reflector lens 19 comprises three elements; two polarising elements 20,22 (alternatively referred to as polarising reflectors) and a Faraday rotator 21 which rotates the plane of polarisation of radiation passing through by 45°. The arrows 23,24 indicate the direction of polarisation of radiation transmitted by the elements 20 and 22 respectively.

For the purpose of this description, the elements 20,21,22 may also be referred to as surfaces 20,21,22. Although the surfaces 20,21,22 are illustrated in FIG. 7 as having curved surfaces, this is not essential. For example, at least one of the surfaces 20,21,22 may have a substantially planar surface.

The arrows shown along the path of radiation 4 indicate the direction of polarisation as the radiation is transmitted through the reflector lens 19. Radiation 4 is incident on the first element 20 where one direction of polarisation is transmitted (i.e. radiation having a its direction of polarisation vertically in the plane of the paper). Radiation transmitted by the first element 20 passes through the second element 21 which rotates the direction of polarisation by 45°. For example, the second element may be a 45° Faraday rotator. The polarisation of radiation incident at the third element 22 is perpendicular to the polarisation state which is transmitted by the surface 20 and is therefore reflected. On the return path, radiation undergoes a further rotation of 45° in its direction of polarisation as it passes through the second element 21. The direction of polarisation is now perpendicular to the transmission axis of the first element 20 and so the radiation is reflected. The reflected beam undergoes a further rotation of 45° as it passes through the second element 21 and its polarisation is such it is then transmitted, and output from the reflector lens 19, by the third element 22. Hence, the operation of the lens arrangement 19 is such that one polarisation passes through the lens without any focussing effect but when the same polarisation passes through a second time, on the return path, it is focussed. The non-reciprocal nature of the lens is achieved by using a Faraday rotator inside the arrangement.

FIG. 8 shows the still more compact scanning apparatus, including the reflector lens 19 shown in FIG. 7. The reflector lens 19 is situated directly in front of the roof reflector 14. If the surfaces of 20,21,22 are of appropriate shape, radiation transmitted through the reflector lens 19 will be focused. Incoming radiation 4, having the correct direction of polarisation, is transmitted through the reflector lens 19 and suffers no deviation while outgoing radiation 4' is focused directly to the receiver 6.

When the polarising roof reflector 14 is employed, the beam of radiation incident on the rotating disc 1 undergoes a considerable displacement along the length of the rotating disc 1. Referring to FIG. 9, it is possible to replace the single roof reflector 14 with a series of roof reflectors 25 of smaller dimension so that upon reflection from the rotating disc 1 radiation is displaced by a reduced amount (the path of radiation is not shown for clarity), therefore reducing the size of the scanning apparatus still further. Again, the reflector lens 19 may be used to focus outgoing radiation 4' directly to the receiver 6.

The rotating disc 1 in FIG. 9 may be slightly concave. In this case, it is possible to achieve the near linear open scan pattern shown in FIG. 10. This open scan pattern enables the number of television lines obtained with the scan pattern in FIG. 2(b) to be doubled. For example, for a detector array comprising a number of detector elements separated by a pitch distance, d, matching the width, w, of the open scan pattern to half of the detector pitch, d, enables an interlaced pattern to be obtained. Hence the maximum spatial frequency performance may be achieved. This is analogous to the microscan technique used in infrared imaging [D. J. Bradley and P. N. J. Denis, "*Sampling effects in HgCdTe focal plane arrays in IR technology* and *applications*" (Ed. L. R. Baker and A. Mason), Proc. SPIE vol 590 pp 53–60 (1985)].

The use of multiple roof reflectors in the arrangement of FIG. 9 can introduce phase changes which impair the spatial resolution of the imager. It may therefore be preferable to sacrifice the benefit of the reduced size of the apparatus in FIG. 8 and to use only a single roof reflector, as shown in FIG. 8. However, the configuration shown in FIG. 8 can lead to pupil wander due to the displacement of an incoming beam 4 by the disc 1 and the roof reflector 15a,15b arrangement and therefore the effective pupil area of the system is reduced.

Figure 13:
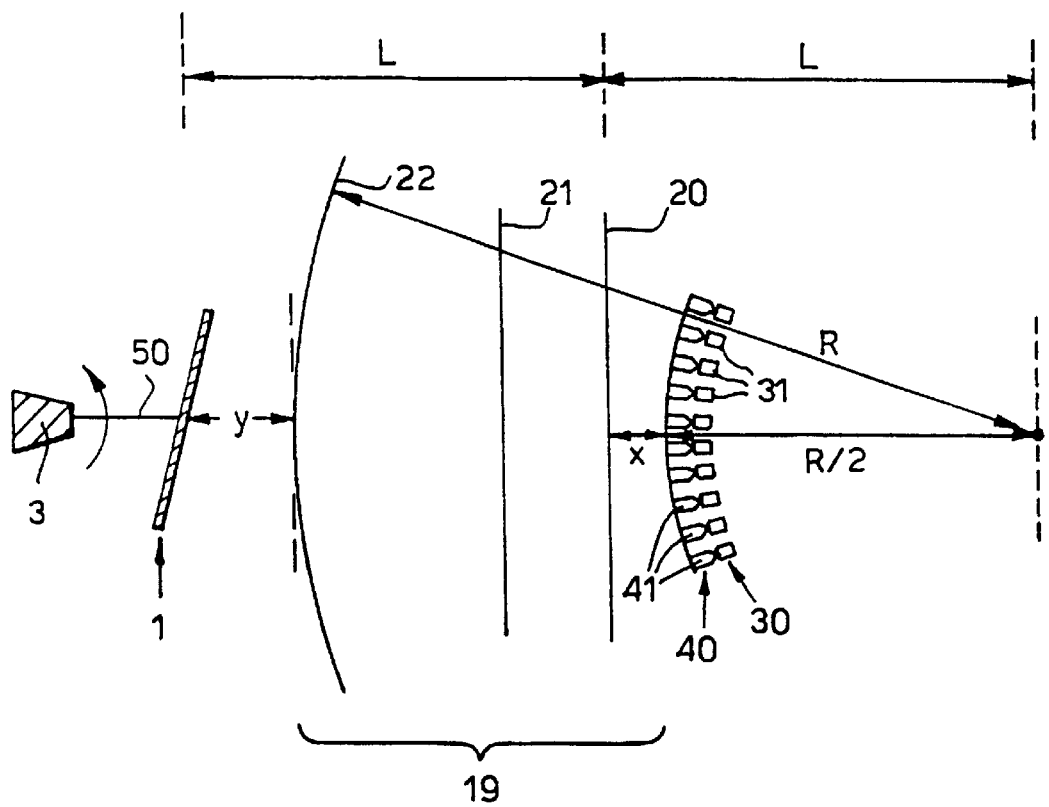
FIG. 13 shows a further diagram of a scanning system providing a conical scan pattern, including the polarisation sensitive reflector lens in FIG. 7.

The apparatus may also be configured to provide a conical scanning system, rather than a raster scan. Configurations for achieving this are shown in FIGS. 11 and 13 to 18. The enhanced configuration shown in FIG. 13 provides advantages over the apparatus shown in FIG. 8 in that it is more compact and does not give rise to pupil wander. It also has a much improved spatial resolution over the apparatus of FIG. 9. The arrangement shown in FIG. 13 also provides the advantage that optical aberrations in the image formed at the detector array are minimised. More specifically, astigmatism and coma aberrations are minimised.

The apparatus shown in FIG. 13 comprises a feedhorn array 40, comprising feed horns 41, and a detector array 30 having a number of detector elements 31. The detector elements 31 are fed by feed horns 41 in the feed horn array 40. The apparatus also comprises a reflector lens 19 and a rotating plate or disc 1. The disc 1 typically rotates about an axis passing through its centre at an angle of inclination of a few degrees to the normal to the axis, say 5°, as described previously.

The reflector lens 19 has the structure described with reference to FIG. 7 and comprises a polarising reflector element 20, for example a vertical wire grid, a 45° Faraday rotator 21 and a polarising reflector element 22, for example a 45° wire grid. As described previously, the operation of the reflector lens 19 is such that incident radiation 4 of one polarisation, in this case horizontal polarisation, passes through the lens arrangement without any focussing effect, as described previously, whereas on passing through the lens 19 for a second time, from the opposite direction, it is focussed.

In the arrangement shown in FIG. 13, the polarising reflector grid 20 has a substantially flat surface and the polarising reflector grid 22 has a substantially spherical surface. This spherical surface has a centre of curvature at C and a radius of curvature R and therefore has a focus at a distance R/2 from the spherical surface. The feed horns 41 form part of a spherical surface having half the radius of curvature of the spherical reflector grid 22 (i.e. radius of curvature=R/2) and being concentric with it. The feed horns are therefore located at a distance of substantially R/2 from the centre of the image of the entrance pupil formed at the centre of curvature, C. The axis 50 about which the disc 1 rotates passes through the centre of curvature, C, of the spherical reflector grid 22.

As illustrated in FIG. 13, x is the distance between the feed horn array 40 and the plane reflector grid 20, L , represents the distance between the plane reflector grid 20 and the image plane, 35, and also the distance between the plane reflector grid 20 and the disc 1. The distance y is the distance, along the axis of rotation 50 of the disc, between the concave reflector grid 22 and the disc. The distance y is equal to twice the distance x. Using these dimensions, astigmatism and coma aberrations in the image formed at the detector are minimised. If the plane reflector grid 20 had a concave or spherical surface instead, the distances, L, in FIG. 13 need not be equal.

Radiation enters the apparatus from the right hand side of the figure and falls on the off-axis spinning disc 1, the disc 1 forming the entrance pupil of the apparatus. Radiation is reflected at the disc 1 and travels back through the apparatus and is reflected by the plane reflector grid 20. Reflection from the concave reflector grid 22 focusses the radiation into the feed horn array 40.

There is an angle of 45 degrees between the orientations of the wires in the plane reflector grid 20 and the wires in the concave reflector grid 22 and the Faraday rotator 21, typically a ferrite Faraday rotator, rotates the plane of polarisation by 45 degrees. Therefore radiation entering from the right hand side will pass unfocussed through the optics, whereas radiation reflected from the disc 1 will be focussed into the feed horn array 40.

The centre of the entrance pupil (disc 1) is imaged by the plane polarising reflector 20 to the centre of curvature, C, of the spherical polarising element 22. Using this arrangement optical aberrations in the image at the detector array are minimised. More specifically, astigmatism and coma aberrations are minimised.

Figure 12:
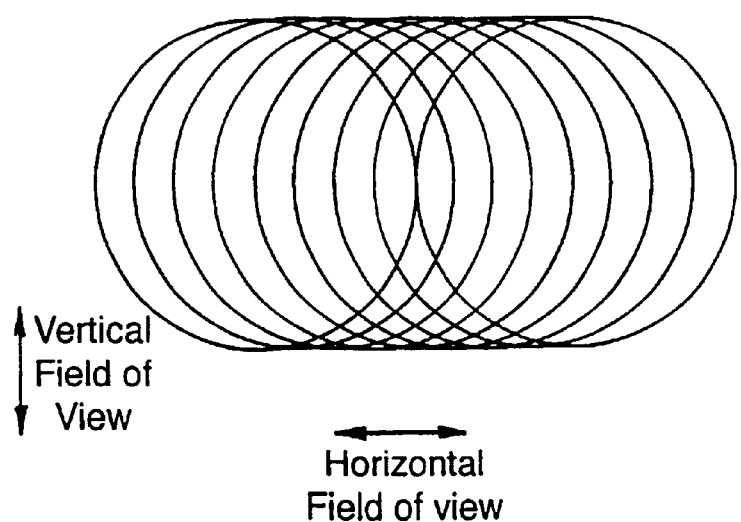
FIG. 12 shows the scan pattern which may be achieved using the apparatus shown in FIG. 11.

A single detector element 31 in the detector array 30 traces out a circular scan pattern. As the detector elements 31 lie adjacent to one another, the image formed is a series of displaced circles, as shown in FIG. 12. As the reflector lens 19 can be placed between the detector array 30 and the rotatable disc 1 the scanning system is compact. In conventional arrangements, scanning optics have to be located apart from the focussing components which can make such systems inconveniently large.

As a further improvement, a corrector plate (60) may be placed between the rotatable disc 1 and the spherical polarising element 22 to remove spherical aberrations from the image formed at the detector array 30.

In addition to correcting for spherical aberrations, the corrector plate (60) may be modified to enable the over-dimensioning of the static reflector lens (19) to be reduced. By incorporating some positive power into the corrector plate (60), a weak converging element may be created, allowing the diameter of the static reflector lens (19) to be reduced.

Figure 14:
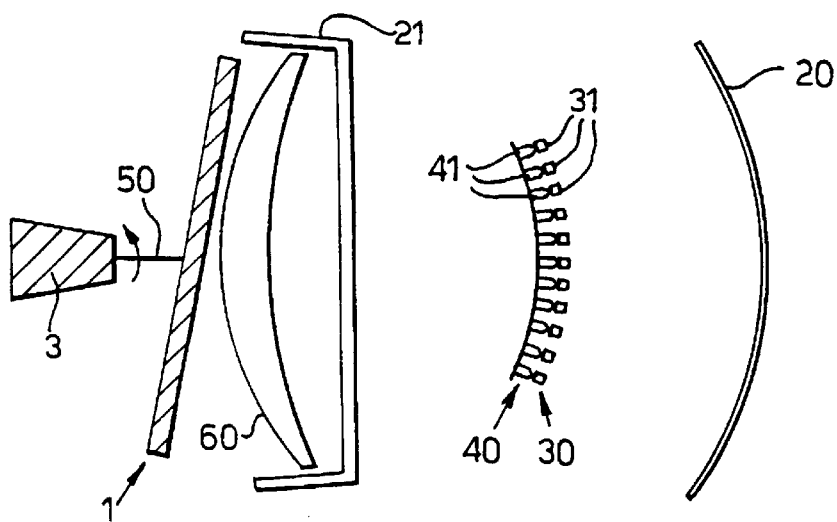
FIG. 14 shows an embodiment of the apparatus incorporating a corrector plate to reduce the over-dimensioning of the main static reflector lens.

FIG. 14 shows an expanded form of the scanner incorporating a converging aspheric convex corrector lens and a static reflector lens (19) of reduced diameter. In this configuration, the majority of the converging power of the scanner remains in the reflector lens (19), ensuring minimal coma, astigmatism and spherical aberration. Off-axis aberrations caused by the converging corrector plate will also be small and can be partially corrected by adjusting the aspheric deformation of the corrector plate. However, the converging effect of the corrector plate should be kept to the minimum required to eliminate the over-dimensioning of the static reflector lens (19).

Figure 15:
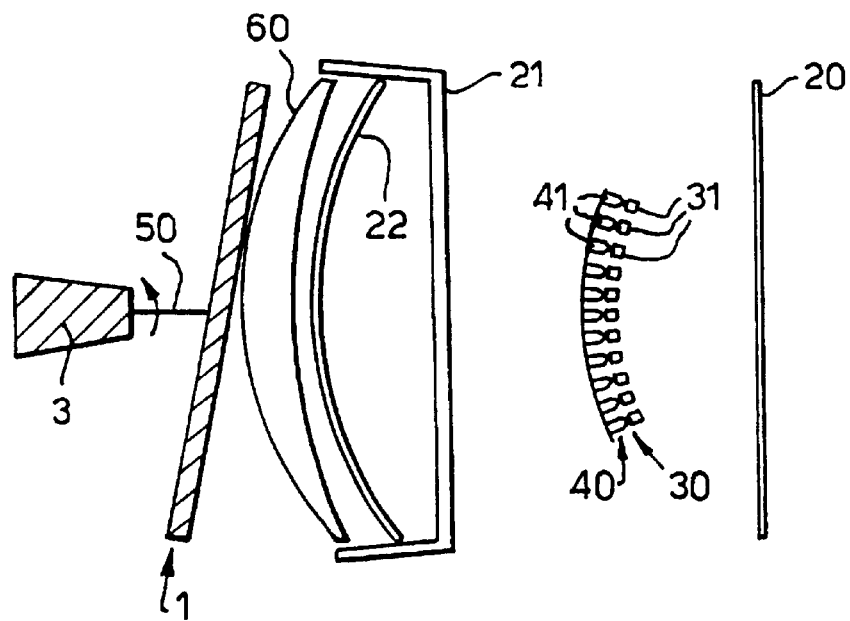
FIG. 15 shows a diagram of a compact configuration for the embodiment in FIG. 14.

FIG. 15 shows a compact scanning apparatus including an aspheric convex corrector lens.

Figure 16:
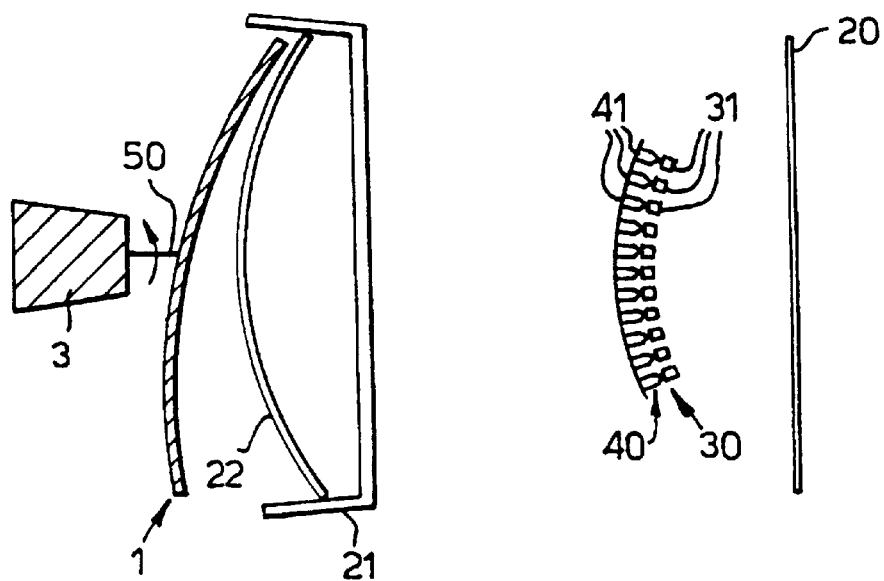
FIG. 16 shows an embodiment of the apparatus incorporating a corrected concave scanning disc to reduce the over-dimensioning of the main static reflector lens.

An alternative configuration for reducing the over-dimensioning of the static reflector lens is shown in FIG. 16 and includes a concave rotatable disc (1). Applying a concave profile to the rotatable disc (1) has the same effect as using a converging corrector plate in FIGS. 14 and 15.

Whilst a converging corrector plate or converging scanning mirror can be used to reduce the over-dimensioning of the static reflector lens (19), for large aperture systems or those operating at shorter wavelengths the aberrations resulting from this technique may well be large enough compared to the wavelength to be unacceptable.

An alternative technique aimed at eliminating unacceptable optical aberrations is to reduce the converging power of the static reflector lens (19) and to incorporate more or all of the converging power into the rotatable disc (1). In this configuration the elements of the static reflector lens (19) are now plane or much closer to being plane.

The rotatable disc (1) typically needs further optical correction and this may be provided by a layer of dielectric (65) applied to the surface of the rotatable disc (1) rather than by a separate corrector plate. The dielectric layer (65) and the underlying rotatable disc would typically exhibit different profiles, with both the rotatable disc and dielectric surfaces being aspheric. High density polyethylene is a suitable material for the dielectric layer (65) in such a scanner.

Figure 17:
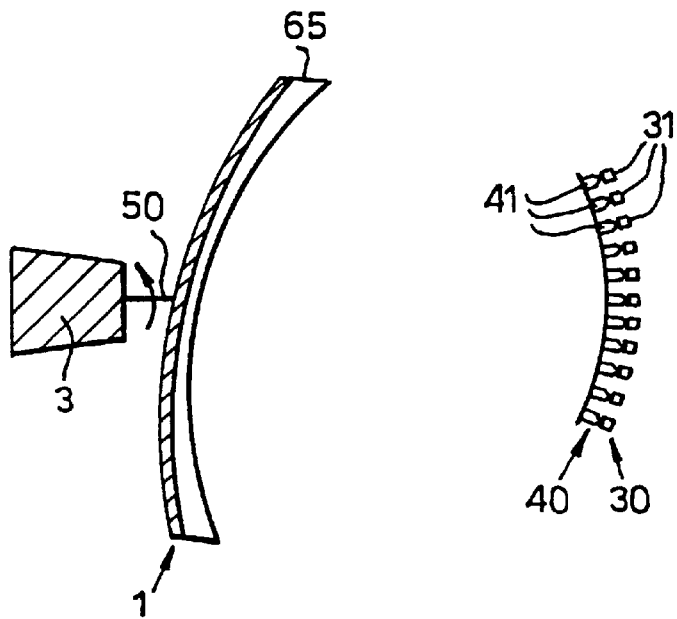
FIG. 17 shows an embodiment of the apparatus incorporating a rotatable Mangin mirror scanning disc in place of separate scanning disc and corrector lens.

This form of optical correction is known as a Mangin mirror and is shown in FIG. 17. In this example the static reflector lens (19) has been eliminated since all of the converging power of the scanning apparatus has been incorporated into the rotatable disc (1).

The rotatable Mangin mirror offers advantages over a conventional static corrector plate. Since the dielectric layer (65) is attached to the rotating disc (1), incident or reflected radiation is never at more than at half the angle to normal incidence that such radiation would be with a fixed corrector. Accordingly, correction of aberrations is more efficient than with a fixed corrector plate for an otherwise identical design. In addition, the rotatable Mangin mirror forms the entrance pupil to the scanner, thus there is no over-dimensioning nor pupil wander.

A further advantage of the Mangin mirror configuration is that the feed horns (41) in the feed horn array (40) are now pointing inwards, allowing more space for RF components to be packed behind them.

Figure 18:
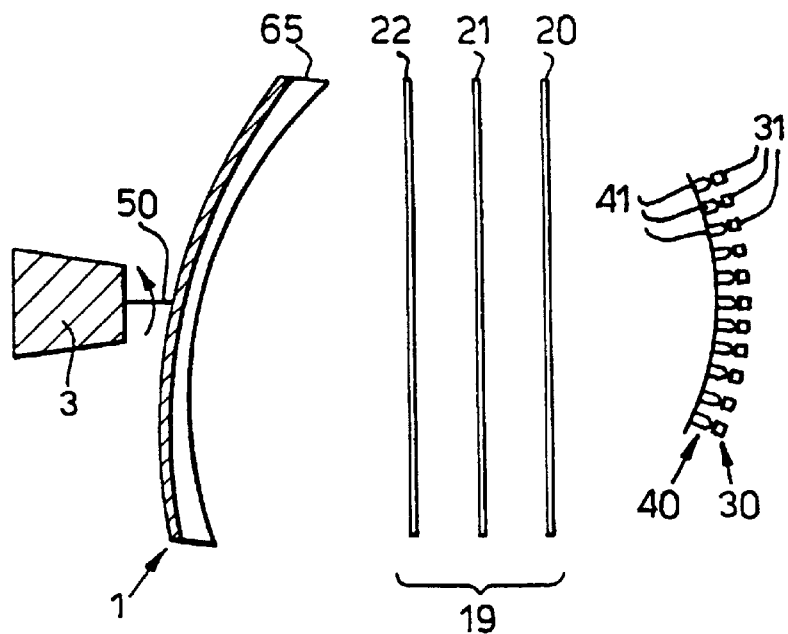
FIG. 18 shows a diagram of a compact configuration for the embodiment in FIG. 14, including the polarisation sensitive reflector lens in FIG. 7.

FIG. 18 shows a compact scanner configuration utilising a rotatable disc (1) incorporating a Mangin mirror and static plane reflector lens (19). The main purpose of the plane reflector lens in this configuration is to fold the optical path to make the system more compact.

In any of the arrangements shown in FIGS. 8, 9, 11, 13–16 or 18, two or more reflector lenses (19) may be included in series.

For some applications the conical scanning apparatus shown in FIGS. 11, or 13 to 18 may be preferred over the FIG. 8 and 9 configurations, even at the expense of the more complex conical scan pattern. In practice, the preferred configuration of the apparatus will depend on the particular application for which it is to be used.

Whilst the scanning apparatus has been described with reference to millimetre wave imaging in particular, it may also be applicable to other radiometry systems. The technique of transmitted high powered radio waves to a scene and analysing radiation transmitted back to a radar receiver is well known. For example, by scanning radiation transmitted back to the radar receiver using the scanning apparatus, the need for large, moveable receiver elements employed in radar systems is removed. The input radiation to the scanning apparatus is therefore the radiation reflected from the scene which is transmitted to the scene by the radar transmitter. For the purpose of this specification the phrase "radiation from a scene" shall therefore be taken to mean radiation emitted by, reflected from or transmitted from a scene.

What is claimed is:

1. Apparatus for scanning input radiation from a scene and for generating output radiation to form an image at a curved detector array comprising;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to a direction parallel with or orthogonal to the normal to the reflective plate at the centre of rotation, a rotor for rotating the reflective plate, and a focussing element for producing an image at the detector array, wherein converging effects of the focusing element and the rotatable reflective plate co-operate with the curvature of the detector array to focus the image onto the detector array.

2. The apparatus of claim 1, wherein the rotatable reflective plate is a substantially planar reflector.

3. The apparatus of claim 1, wherein the rotatable reflective plate exhibits a concave profile for producing an image at the detector array, thereby incorporating the function of the focusing element into the rotatable reflective plate.

4. Apparatus for scanning input radiation from a scene and for generating output radiation to form an image at a curved detector array comprising;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to a direction parallel with or orthogonal to the normal to the reflective plate at the centre of rotation, a rotor for rotating the reflective plate, and focussing element for producing an image at the detector array, wherein the converging effects of the focusing element and the rotatable reflective plate co-operate with the curvature of the detector array to focus the image onto the detector array, and wherein the focusing element comprises a lens arrangement, capable of selectively transmitting and focusing radiation having a particular direction of polarisation and arranged to receive both input radiation from the scene and input radiation reflected from the rotatable plate, the lens arrangement comprising a first polarising element, for selectively transmitting and selectively reflecting radiation having a particular direction of polarisation, the first polarising element having a first polarisation axis and having a substantially flat surface, a second element for rotating the direction of polarisation of radiation through substantially 45° and a third polarising element, for selectively transmitting and selectively reflecting radiation having a particular direction of polarisation, the third polarising element having a third polarisation axis and a substantially spherical surface having a centre of curvature, C, and a radius of curvature, R, the third polarisation axis making an angle of substantially 45° with the first polarisation axis, and wherein (i) the axis of rotation of the plate passes through the centre of curvature, C, and (ii) the separation of the first polarising element and the centre of curvature along the axis of rotation and the separation between the first polarising element and the disc along the axis of rotation are substantially equal, wherein optical aberrations in the image formed at the detector array are minimised.

5. The apparatus of claim 4, and further comprising an array of feed horns, the feed horns forming part of a spherical surface having a radius of curvature substantially equal to R/2 and being concentric with the third polarising element.

6. The apparatus of claim 4, and further comprising an array of detector elements.

7. The apparatus of claim 6, wherein the detector array forms part of a millimeter wavelength imaging camera.

8. The apparatus of claim 4 wherein the first polarising element is a planar grid of wires.

9. The apparatus of claim 4 wherein the third polarising element is a substantially spherical grid of wires.

10. The apparatus of claim 4 comprising two or more lens arrangements arranged in series.

11. Apparatus for scanning input radiation from a scene and for generating output radiation to form an image at a curved detector array comprising;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to a direction parallel with or orthogonal to the normal to the reflective plate at the centre of rotation, rotor for rotating the reflective plate and focussing element for producing an image at the detector array wherein the converging effects of the focusing element and the rotatable reflective plate co-operate with the curvature of the detector array to focus the image onto the detector array, wherein the rotatable reflective plate exhibits a concave profile for producing an image at the detector array, thereby incorporating the function of the focusing element into the rotatable reflective plate, and further comprising a dielectric layer located on the surface of the rotatable reflective plate to form a rotatable Mangin mirror configuration, for providing optical correction.

12. The apparatus of claim 11, further comprising a lens arrangement, capable of selectively transmitting and focusing radiation having a particular direction of polarisation, located between the rotatable reflective plate and the detector array and arranged to receive both input radiation from the scene and input radiation reflected from the rotatable reflective plate, the lens arrangement comprising a first polarising element, for selectively transmitting and selectively reflecting radiation having a particular direction of polarisation, the first polarising element having a first polarisation axis and having a substantially flat surface, a second element for rotating the direction of polarisation of radiation through substantially 45° and a third polarising element, for selectively transmitting and selectively reflecting radiation having a particular direction of polarisation, the third polarising element having a third polarisation axis and having a substantially flat surface, the third polarisation axis making an angle of substantially 45° with the first polarisation axis, wherein the optical path within the apparatus is reduced and a compact configuration is achieved.

13. The apparatus of claim 11 wherein the profile of the dielectric layer is different to the profile of the rotatable reflective plate.

14. The apparatus of claim 13 wherein the surface of the dielectric layer and the surface of the rotatable reflective plate are aspheric.

15. The apparatus of claim 4, further comprising a corrector plate located between the rotatable reflective plate and the third polarising element for removing spherical aberrations from an image formed at the detector array.

16. The apparatus of claim 15, wherein the corrector plate is a weak converging element, the arrangement being such that the diameter of the lens arrangement can be reduced.

17. The apparatus of claim 16, wherein the corrector plate exhibits an aspheric convex profile.

18. The apparatus of claim 4 wherein the rotatable reflective plate is a weak converging element for removing spherical aberrations from the image formed at the detector array.

19. The apparatus of claim 4 wherein the rotatable reflective plate is a weak converging element, the arrangement being such that the diameter of the lens arrangement can be reduced.

20. The apparatus of claim 4 wherein the rotatable reflective plate is a strong converging element, the arrangement being such that the converging power of the lens arrangement can be reduced.

21. The apparatus of claim 19 wherein the rotatable reflective plate exhibits an aspheric concave profile.

22. The apparatus of claim 4, and also including a radar receiver.

23. The apparatus of claim 4 wherein the angle of inclination $\theta_a$ is between 1° and 10°.

24. Apparatus for scanning input radiation from a scene and for generating output radiation to form an image at an image plane, said apparatus comprising;

a rotatable reflective plate, forming an entrance pupil to the apparatus, for receiving and reflecting input radiation, the reflective plate having an axis of rotation passing substantially through the centre of the plate, wherein the axis of rotation is inclined at a non-zero angle $\theta_a$ to both the reflective plate and the normal to the reflective plate at the centre of rotation, means for rotating the reflective plate, a focussing element, and a detector situated in the image plane, wherein the image plane is curved and the converging effects of the focusing element and the rotatable reflective plate co-operate with the curvature of the image plane to focus the image onto the detector.

25. The apparatus of claim 24, wherein the detector comprises a curved detector array.

* * * * *